April 7, 1964  P. P. RUMINSKY  3,127,625
METHOD OF FORMING SCREWS FROM FLAT BAR STOCK
Filed March 5, 1963  2 Sheets-Sheet 1
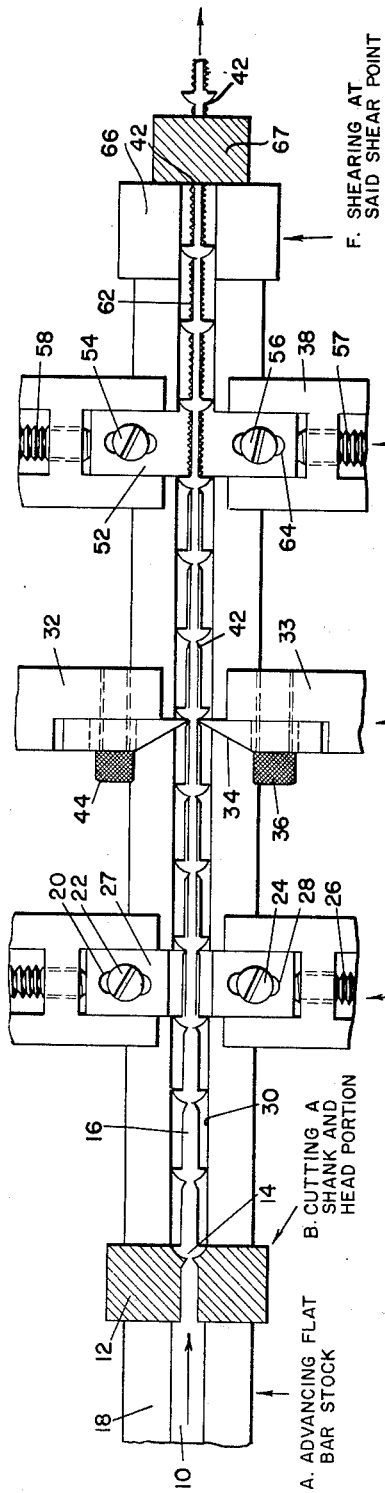
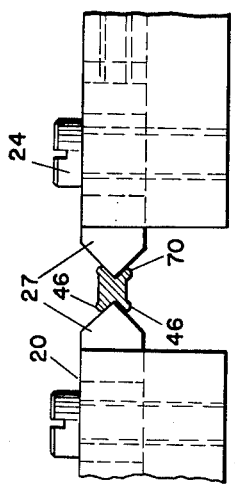
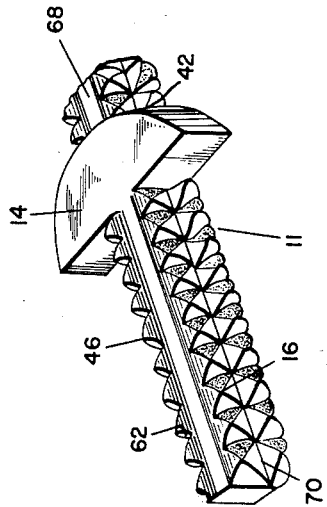
INVENTOR
PAUL P. RUMINSKY
BY Semmes and Semmes
ATTORNEYS April 7, 1964 P. P. RUMINSKY 3,127,625
METHOD OF FORMING SCREWS FROM FLAT BAR STOCK
Filed March 5, 1963 2 Sheets-Sheet 2

INVENTOR
PAUL P. RUMINSKY
BY Semmes and Semmes
ATTORNEYS

United States Patent Office 3,127,625
Patented Apr. 7, 1964

3,127,625
METHOD OF FORMING SCREWS FROM FLAT BAR STOCK
Paul P. Ruminsky, 281 Crocker St., Amherst, Ohio, assignor of one-half to Herbert C. Brauchla, Fremont, Ohio
Filed Mar. 5, 1963, Ser. No. 263,026
5 Claims. (Cl. 10—10)

The present application relates to a method for forming screws, particularly a method for successively forming threaded screws in end to end relationship within an advancing flat bar stock.

Previous inventors, notably British Patent No. 650,741 and Ptak 2,820,972 have developed methods for forming of screws in an advancing stock. British Patent No. 650,-741 concerns formation of screws from wire stock and Ptak concerns formation of screws from flat bar stock. A principal shortcoming in both types of screws is that their shank portion is flattened and has threads only on two opposed sides thereof. Consequently, only a minor portion of the screw shank circumference is threaded which results in a tendency of the screw shank to wobble when imbedded. Also, Ptak requires a notching of the bar stock for guidance purposes and in both Ptak and British Patent No. 650,741 attempt is made to provide a conventional screw head with transverse or Phillips type slots for engagement by conventional screw drivers.

According to the present invention, a screw is formed by trimming a shank and head portion in an advancing flat bar stock, forming upset portions in the four corners of the shank by coining a longitudinal slot in each side of the shank; coining a shear point in the shank rearwardly of the head portion; coining threads in the upset portions of the shank; and sequentially cutting off one or more of the desired screws at the shear point in the advancing stock. The upset portions and threads formed on the shank according to this method, comprise over 60% of the circumference of the shank with a resultant improved screw which has the capability of being seated securely and permanently in the surface in which it is to be embedded. Also, guide notches in the advancing bar stock are eliminated and no especial means are required for formation of the head. It is contemplated that the screws so formed will be used in a gun which could hold a great multiplicity of such screws in end to end relationship within a continuous unsheared line. However, according to the dictates of end use, one or any number of said screws may be cut from the advancing stock.

Accordingly, it is an object of invention to provide an improved method for formation of threaded screws.

Another object of invention is to provide a method for forming of screws from flat bar stock wherein a greater proportion of the screw shank is threaded.

Another object of invention is to provide a method for formation of screws from flat bar stock more efficiently and more economically.

Yet, additional objects of invention will become apparent from the ensuing specification and attached drawings, wherein:

FIG. 1 is an enlarged fragmentary perspective of a single lead screw formed in end to end relationship with other such screws according to the present invention;

FIG. 2 is an in-line schematic of the steps taken in forming the screw;

FIG. 3 is an enlarged side elevation with the screw strip in section and illustrating the forming of upset portions by coining of a longitudinal slot in the sides of the shank;

Figure 7:
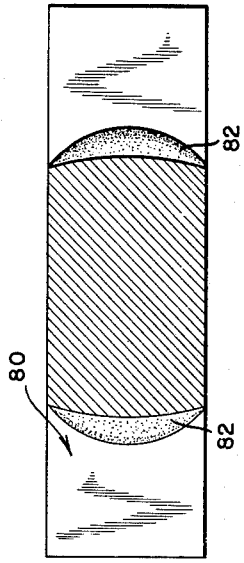
Figure 5:
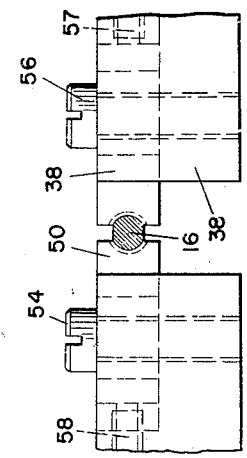
FIG. 5 is an enlarged side elevation with the screw strip in section and showing the step of coining the threads in the upset portions of the shank.
Figure 6:
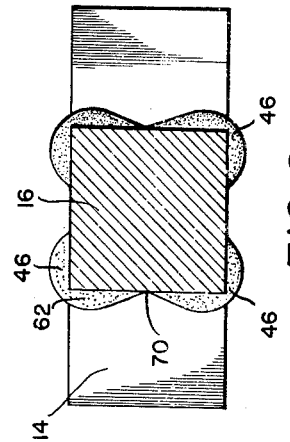

FIG. 6 is a transverse vertical section of the completed screw shank showing threads formed throughout 60% of the shank circumference; and FIG. 7 is a transverse vertical section of a conventional screw shank 80 formed from flat bar stock and having threaded portions 82 only on two of its opposed sides.

In FIG. 1 a threaded screw 11 is illustrated as comprising a head 14 and a shank 16. Longitudinal slots 70 have been formed in the sides of the shank so as to form opposed upset portions 46 at each corner of the shank. Threads 62 have been formed in these upset portions. A bur may exist at shear 42 adjacent head 14 as a result of the shearing action. However, it is contemplated that in driving of the individual screws this bur will be effectively burnished by the screw driving action of the succeeding screw shank tip 68. This burnishing action is described in applicant's co-pending application Serial No. 263,025 entitled Method for Driving Screws, filed March 5, 1963. As indicated therein, the individual screws are driven by means of a screw strip which is rotated. The lead screw is thus advanced into a surface and sheared from its succeeding screw by the rotating action of the strip, or the lead screw head, itself, is secured against rotation by embedment in the surface.

In FIG. 2 flat bar stock 10 is illustrated as being advanced in the direction of the arrow upon base 18 and within guide 30. Initial trimming of the advancing bar stock is by means of vertically reciprocated trimming dies 12 which cut the shank 16 and head portion 14. As the bar stock advances, it is in turn slotted horizontally by slot swaging dies 20, having swaging pieces 27 mounted adjustably therein by means of set screws 22, 24 and 26. Lateral adjustability is provided by slots 28 in the swaging pieces. Dies 20 may be of a cam-operated type wherein a downward action of a cam gives a lateral joining action of the swaging pieces. As illustrated in FIGS. 3 and 6 this coining of longitudinal slots forms upset portions 46 at the four corners of shank 16 and throughout more than 60% of shank 16 circumference.

Figure 4:
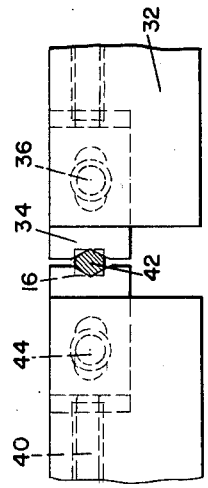
FIG. 4 is an enlarged side elevation with the screw strip in section and showing the step of coining a shear point adjacent the head portion.

As illustrated in FIGS. 2 and 4 a shear point 42 is then coined in the four sides of the shank rearwardly of head 14 by means of dies 32 and 33 having coining pieces 34 adjustably fixed therein by means of set screws 36 and 44.

At the threading station, threads 62 are coined in the four upset portions 46 by means of thread-coining dies 38 having coining pieces 52 adjustably secured therein by means of screws 54, 56, 57 and 58. Subsequent to forming of threads 62, flat bar stock 10 is advanced through guide piece 66 and cut at shear point 42 by means of vertically reciprocated shear 67.

The screw formed according to the present method may be used as a conventional screw which has its threads formed about its entire circumference. It is contemplated that a principal industrial application of the present screw will be in fixture equipment wherein the appearance of the screw itself is not a factor; for example, in securing television, radio, refrigerator, and washing machine components, kitchen cabinets and the like. Needless to say, the screw formed according to the present method is considerably cheaper than conventionally formed threaded screws.

Manifestly, the recited steps may be carried out in differing order and variations in coining and trimming may be attempted without departing from the spirit and scope of invention, as defined in the sub-joined claims.

I claim:
1. Method of forming screws comprising:
(A) trimming a shank and head portion in flat bar stock;
(B) forming upset portions by swaging a longitudinal slot in the side of the shank to flow the shank outwardly of the top and bottom surfaces of the flat bar stock, thus thickening the shank at the side edges thereof;
(C) coining a shear point adjacent said head portion; and
(D) swaging threads in said upset portions by applying a lateral force to said thickened edges of said shank.

2. A method of forming screws comprising:
(A) advancing flat bar stock;
(B) trimming successive shank and head portions in said stock;
(C) forming upset portions by swaging longitudinal slots in each side of said shank to flow the shank outwardly of the top and bottom surfaces of the flat bar stock, thus thickening the shank at the side edges thereof;
(D) coining shear points in said advancing stock rearwardly of each of said head portions;
(E) swaging threads in said upset portions by applying a lateral force to said thickened edges of said shank; and
(F) separating pre-selected numbers of screws from said advancing flat bar stock by shearing at said shear point adjacent said head portion.

3. Method as in claim 2, wherein said upset portions are formed on the opposed four corners of said shank.

4. Method as in claim 3, wherein said coining of said shear point includes coining action upon four sides of said shank.

5. Method as in claim 3, wherein said upset portions and said threads are formed over sixty percent of the circumference of said shank.

References Cited in the file of this patent
UNITED STATES PATENTS

| | | |
|---|---|---|
| 996,840 | Deeds | July 4, 1911 |
| 2,820,972 | Ptak | Jan. 28, 1959 |